US007071922B2

United States Patent
Sun et al.

(10) Patent No.: US 7,071,922 B2
(45) Date of Patent: Jul. 4, 2006

(54) OPTICAL MOUSE WITH ROLLING BALL

(75) Inventors: Tsung-Ting Sun, Taipei (TW);
Jui-Chien Chuang, I Lan Hsien (TW);
Cheng-Hung Tsai, Hsin Chu (TW);
Hsuan Kai Huang, Taipei (TW)

(73) Assignee: Edison Opto Corp., Taipei (TW)

( * ) Notice: Subject to any disclaimer, the term of this patent is extended or adjusted under 35 U.S.C. 154(b) by 0 days.

(21) Appl. No.: 10/294,636

(22) Filed: Nov. 15, 2002

(65) Prior Publication Data

US 2004/0095322 A1 May 20, 2004

(51) Int. Cl.
*G09G 5/08* (2006.01)

(52) U.S. Cl. .................. 345/166; 345/157; 345/167; 345/163; 345/164

(58) Field of Classification Search .............. 345/156, 345/157, 163, 164, 167, 179, 173, 158, 175, 345/176, 180, 165; 248/346.01
See application file for complete search history.

(56) References Cited

U.S. PATENT DOCUMENTS 5,477,237 A * 12/1995 Parks ........................ 345/156
5,726,685 A * 3/1998 Kuth et al. ................. 345/173
6,084,574 A * 7/2000 Bidiville ..................... 345/166
6,624,808 B1 * 9/2003 Andrews .................... 345/163
2003/0025671 A1 * 2/2003 Cheng ........................ 345/163
2003/0117370 A1 * 6/2003 Van Brocklin et al. ..... 345/156
2003/0156098 A1 * 8/2003 Shaw et al. ................. 345/163
2003/0169235 A1 * 9/2003 Gron et al. ................. 345/167
2004/0017355 A1 * 1/2004 Shim .......................... 345/157
2004/0095322 A1 * 5/2004 Sun et al. ................... 345/165
2004/0206874 A1 * 10/2004 Pearson ................. 248/346.01
2005/0024335 A1 * 2/2005 Wang ......................... 345/166

* cited by examiner

*Primary Examiner*—Vijay Shankar
*Assistant Examiner*—Prabodh Dharia

(57) ABSTRACT

An optical mouse is operated on a work surface and includes at least one light emitter for emitting a light beam; a light receiver contained by a casing; a rolling ball arranged on the casing and opposite to the light receiver. The light beam has only one reflection by the rolling ball during an optical path thereof and then is detected by the light receiver. The rolling ball is made of transparent material and the distance thereof with the light receiver is adjustable to vary image resolution. The optical mouse can be turned over and placed on a notebook computer for using as a track ball.

17 Claims, 3 Drawing Sheets

OPTICAL MOUSE WITH ROLLING BALL

FIELD OF THE INVENTION

The present invention relates to an optical mouse, especially to an optical mouse with rolling ball.

BACKGROUND OF THE INVENTION

In personal computer, the computer mice are popular pointing means for input data and cursor control. A conventional mechanical mouse generally employs a rolling ball and at least two encoder wheels for x- and y-axis. The encoder wheels are driven by the roll ball when a user moves the mouse along a flat surface such as a mouse pad. The encoder wheels will intermittently block a light propagation in the mouse and associated electronic signal is generated to control cursor movement on a computer display. However, the performance of the mechanical mouse is degraded after a long time use due to ball abrasion and dust inleakage. Moreover, the mechanical mouse uses a bulky and heavy steel ball, which is also inconvenient for user.

To overcome those drawbacks, an optical mouse is provided and has a light transmitter such as light emitting diode (LED), light receiver such as a photo diode and associated components. The prior art optical mouse should be operated on a patterned surface for modulating a light emitted from the light transmitter. The modulated light is received by the light receiver to identify mouse movement and control cursor motion.

However, the above-mentioned optical mouse required specialized mouse pad for normal operation, the applicability thereof is limited. As the advancement of complementary metal oxide semiconductor (CMOS) image sensor technologies and digital signal processing, the optical mouse can use CMOS sensor array to overcome above problem. The optical mouse may be operated at an non-transparent flat surface and the detected signals of the CMOS sensor array are analyzed to identify mouse movement and control cursor motion.

FIG. 1 shows a section view of partial components in a conventional optical mouse. The conventional optical mouse comprises a light transmitter 10 such as LED for emitting a light beam, a light emitting prism 12 and a light receiver 20 such as CMOS sensor array 20. As shown in this figure, the light emitting prism 12 has a special shape rendering the light beam impinging a work surface 100 with small incident angle. Therefore, a relatively large portion of reflected light from the work surface 100 can be detected by the light receiver 20. Even though the light beam is scattered by an uneven work surface 100, a larger portion of scattered light can be detected by the light receiver 20. The electrical signal associated with the received light is analyzed by a DSP element (not shown) in the mouse to identify mouse movement.

However, in the optical mouse shown in FIG. 2, the light emitting prism 12 with special shape is required such that the light beam has small incident angle as impinging the work surface 100 after experiencing two reflections by light emitting prism 12. The light emitting prism 12 requires considerable effort and cost to manufacture and assemble. Moreover, the multiple reflection by the light emitting prism 12 also cause attenuation in intensity of light beam.

SUMMARY OF THE INVENTION

It is an object of the present invention to provide an optical mouse with higher light transmission efficiency and low cost.

It is another object of the present invention to provide an optical mouse with adjustable resolution.

It is still another object of the present invention to provide an optical mouse providing dual-mode function for a computer.

In one aspect of the invention, the optical mouse of the present invention has at least one light emitter for emitting a light beam; a light receiver contained by a casing; a rolling ball arranged on the casing and opposite to the light receiver. The light beam has only one reflection by the rolling ball during an optical path thereof and then is detected by the light receiver.

In another aspect of the invention, the rolling ball is made of transparent material and the distance thereof with the light receiver is adjustable to vary image resolution.

In still another aspect of the invention, the optical mouse is a wireless optical mouse. The mouse can be turned over and placed on a notebook computer for using as a track ball and can be detached from the computer for using as a wireless mouse.

The various objects and advantages of the present invention will be more readily understood from the following detailed description when read in conjunction with the appended drawing, in which:

DETAILED DESCRIPTION OF THE INVENTION

Figure 1:
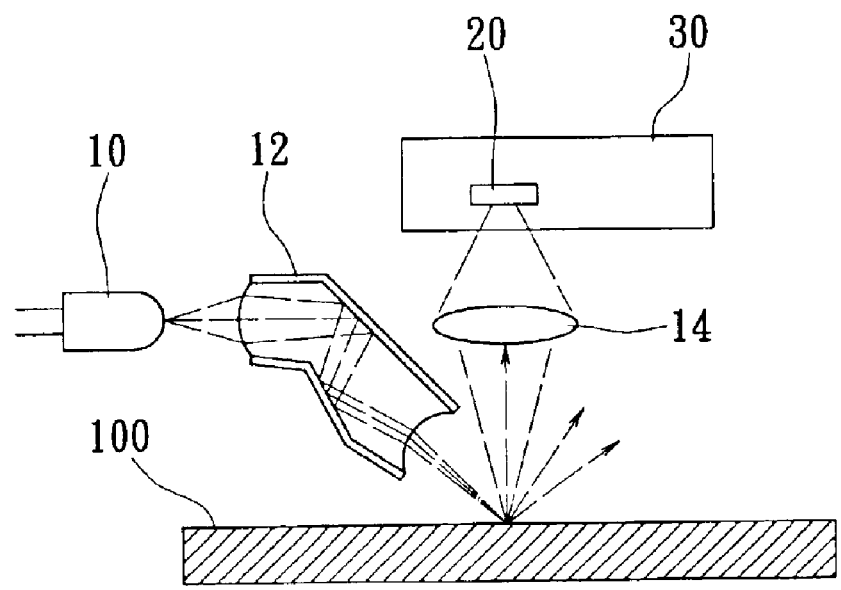
FIG. 1 shows a section view of partial components in a conventional optical mouse.
Figure 2:
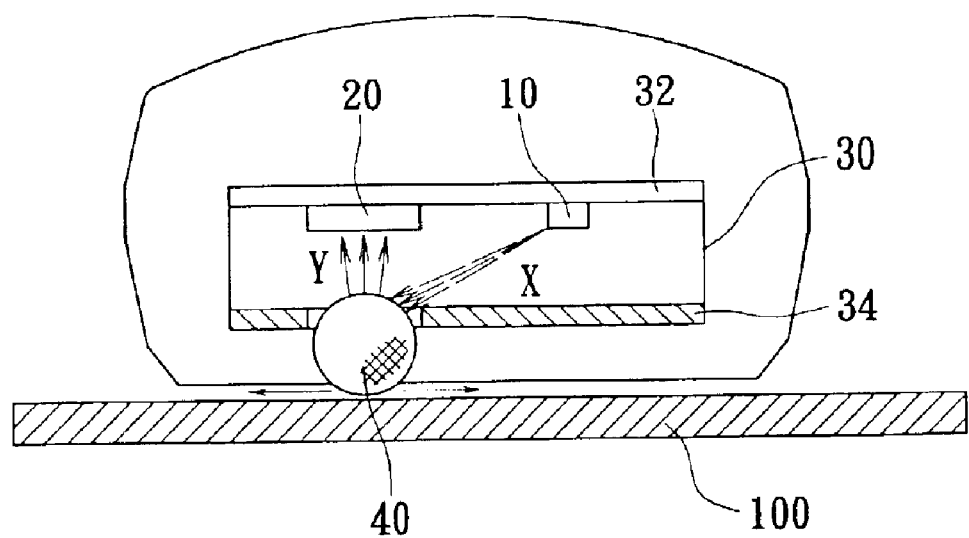
FIG. 2 shows a sectional view of an optical mouse according to the first preferred embodiment of the present invention.

FIG. 2 shows a sectional view of an optical mouse 1 according to the first preferred embodiment of the present invention. The optical mouse 1 according to this preferred embodiment of the present invention comprises at least a light transmitter 10 such as LED for emitting a light beam, a casing 30, a light receiver 20 (such as CMOS sensor array or a CCD array) arranged on a first face 32 of the casing 30, and a rolling ball 40 mounted within a rounded hole (not labeled) on a second face 34 of the casing 30 opposite to the first face 32. The rolling ball 40 has size of 1–10 mm. When the mouse is moved, the light beam is reflected by the rolling ball 40 rolled along a work surface and an image of the rolling ball 40 is detected by the light receiver 20. In this preferred embodiment of the present invention, the light beam is subjected to only one reflection by the ball 40, the transmission efficiency is enhanced. Therefore, a low-power light source is feasible and the cost can be further reduced. Moreover, the light emitting prism with a special shape is eliminated to reduce cost and assembling effort.

Figure 3:
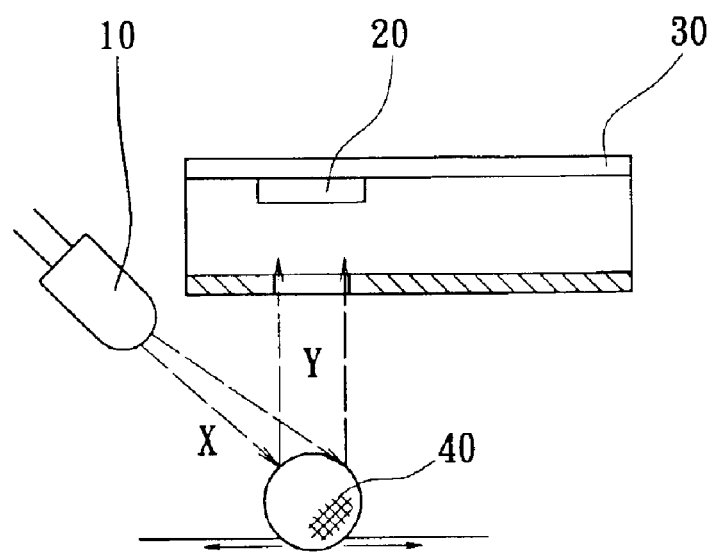
FIG. 3 show a sectional view of an optical mouse according to the second preferred embodiment of the present invention.

FIG. 3 show a sectional view of an optical mouse 1 according to the second preferred embodiment of the present invention. The rolling ball 40 is made of transparent material and the distance Y with the light receiver 20 is adjustable to vary image resolution.

As can be seen from FIGS. 2 and 3, the light receiver 20 is placed in the casing 30 to reduce assembled size and cost. However, the light receiver 20 is placed outside the casing 30 to get image-object ratio of larger extent.

Figure 4:
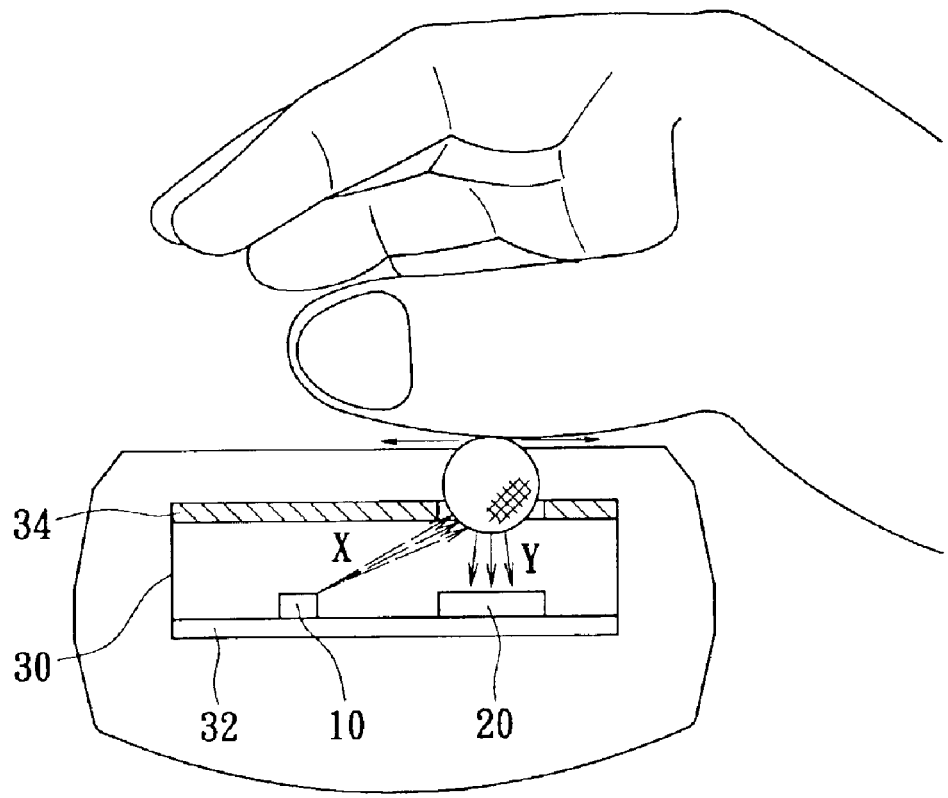
FIG. 4 show a sectional view of an optical mouse according to the third preferred embodiment of the present invention.

FIG. 4 show a sectional view of an optical mouse 1 according to the third preferred embodiment of the present invention. The rolling ball 40 is placed at topmost position of the mouse 1 and the internal components of the mouse are adapted for the arranged location of the ball 40. In this case, the ball 40 can be used as a tracking ball due to the light weight thereof.

Figure 5:
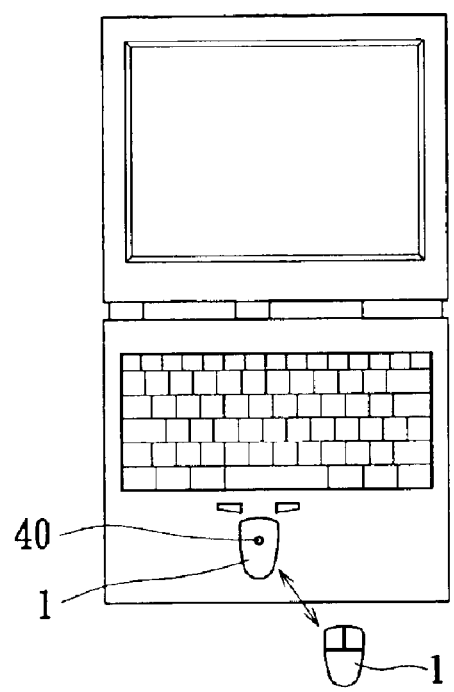
FIG. 5 show a top view of the fourth preferred embodiment of the present invention. In this preferred embodiment.

FIG. 5 show a top view of the fourth preferred embodiment of the present invention. In this preferred embodiment, the optical mouse is a wireless mouse with a wireless transmitter (not shown) and a wireless receiver (not shown). However, the wireless transmitter and the wireless receiver are known art and not described in detail here. The optical mouse 1 has structure similar to that shown in FIG. 2. The optical mouse 1 is turned over and placed in a concave chamber (not shown) on top face of a body of a notebook computer. The concave chamber, for example, can be placed on a space on top face of the notebook computer and adjacent to the keyboard as shown in this figure. In this arrangement, the ball 40 is located at the topmost position of the mouse 1. Therefore, the ball 40 can be used as a tack ball. Moreover, the mouse 1 has a connector (not shown) connected to the power supply of the notebook computer through an adaptor circuit (not shown), whereby the battery of the wireless optical mouse can be charged when the mouse 1 is placed on the chamber and used as track ball. The mouse 1 can also be detached from the chamber and used as a wireless mouse as shown in the right side of the arrow. Therefore, the wireless optical mouse according to the present invention has dual function as track ball and wireless mouse.

Figure 6:
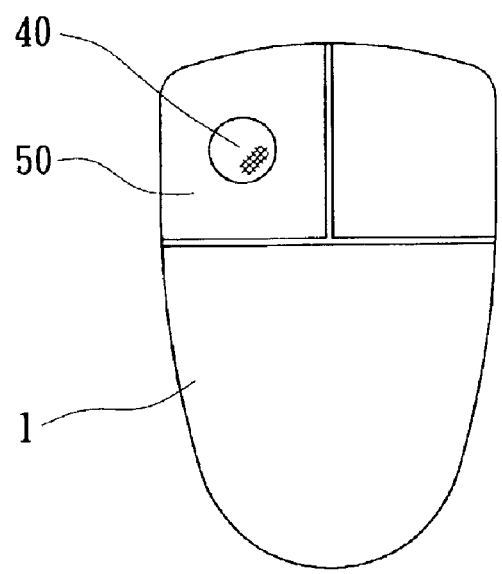
FIG. 6 show a top view of the fifth preferred embodiment of the present invention.

FIG. 6 show a top view of the fifth preferred embodiment of the present invention. In this preferred embodiment, the rolling ball 40 is arranged on a pushing button 50 of a mouse 1. The rolling ball 40 has smaller size (1–10 mm) than the steel ball of conventional mechanical mouse and has light weight. Therefore, the user can easily slide the rolling ball 40 to control movement of cursor without involving wrong operation of the button 50. In other word, only slight force is required to slide the ball 40 and the force is not enough to cause pressing operation of the button 50, It should be noted the optical mouse according to the present invention has various modifications. For examples, the LED can be lamp type LED, surface mount device (SMD) LED, lateral side emission LED or oblique emission LED. The LED can emit light covering wavelength region of single color, dual color or multiple color. The LED can be packaged by plastic leadless chip carrier (PLCC), glob-top COB (chip on board) or transfer molding COB. The work surface also includes a finger print.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An optical mouse having a rolling ball and operated on a work surface, comprising:
   at least one light emitter disposed on an upper wall of a casing for emitting a light beam;
   a light receiver disposed on the upper wall of the casing, where space between the light emitter and the light receiver defines an optical path for the light beam;
   a rolling ball aligned in the casing in opposing spaced relationship with the light receiver, the light beam directly impinging the rolling ball unobstructedly from the light emitter, the rolling ball having a reflective outer surface in the optical path, the reflective outer surface being the only reflective surface in the optical path.

2. The optical mouse as in claim 1, wherein the rolling ball is a single piece construction of a transparent material.

3. The optical mouse as in claim 1, wherein the rolling ball has size of 1–10 mm.

4. The optical mouse as in claim 1, wherein a distance of the spaced relationship between the rolling ball and the light receiver can be changed to adjust a resolution of an image of the ball detected by the light receiver.

5. The optical mouse as in claim 1, wherein the light emitter is a light emitting diode.

6. The optical mouse as in claim 5, wherein the light emitting diode is one of the group consisting of a lamp type LED, a surface mount device (SMD) LED, a lateral side emission LED and an oblique emission LED.

7. The optical mouse as in claim 5, wherein the light emitting diode emits a light of a single wavelength.

8. The optical mouse as in claim 5, wherein the light emitting diode emits a light of multiple wavelengths.

9. The optical mouse as in claim 1, wherein the light emitter is packaged by one of the group consisting of a plastic leadless chip carrier (PLCC), a glob-top COB (chip on board) and a transfer molding COB.

10. An optical mouse having a rolling ball, the optical mouse having at least one pushing button, the mouse comprising:
    at least one light emitter disposed on an upper wall of a casing for emitting a light beam;
    a light receiver disposed on the upper wall of the casing, where space between the light emitter and the light-receiver defines an optical path for the light beam;
    a rolling ball mounted on an outer surface of the pushing button such that a portion thereof extends into the casing to be aligned in opposing spaced relationship with the light receiver, the light beam directly impinging the rolling ball unobstructedly from the light emitter, the rolling ball having an outer reflective surface in the optical path, the reflective outer surface being the only reflective surface in the optical path light being reflected by the reflective surface forming an image on the light receiver to produce an image signal, the image signal being analyzed as a user rotates the rolling ball to control cursor movement.

11. The optical mouse as in claim 10, wherein the rolling ball is a single piece construction of a transparent material.

12. The optical mouse as in claim 10, wherein the rolling ball has size of 1–10 mm.

13. The optical mouse as in claim 10, wherein the light emitter is a light emitting diode.

14. A computer with a dual mode optical mouse, the computer having a chamber on a top face thereof for receiving the optical mouse; the optical mouse comprising:

at least one light emitter disposed on an upper wall of a casing for emitting a light beam;

a light receiver disposed on the upper wall of the casing, where space between the light emitter and the light receiver defines an optical oath for the light beam;

a rolling ball mounted on a bottom of the casing such that a portion thereof extends into the casing to be aligned in opposing spaced relationship with the light receiver, the light beam directly impinging the rolling ball unobstructedly from the light emitter, the rolling ball having a reflective outer surface in the optical path, the reflective outer surface being the only reflective surface in the optical path, the mouse being receivable in the chamber so that the ball is oriented upward to provide direct access thereto by a user.

15. The computer as in claim 14, wherein the rolling ball is a single piece construction of a transparent material.

16. The computer as in claim 14, wherein the light emitter is a light emitting diode.

17. The computer as in claim 14, wherein the mouse further has a connector for coupling to a circuit of the computer, power being transferred to the mouse from the computer through the connector when the mouse is placed on the chamber.

\* \* \* \* \*